(12) United States Patent
Smith et al.

(10) Patent No.: US 9,625,921 B2
(45) Date of Patent: Apr. 18, 2017

(54) LIFE OF A SEMICONDUCTOR BY REDUCING TEMPERATURE CHANGES THEREIN VIA SWITCHING FREQUENCY

(71) Applicant: GE Energy Power Conversion Technology Ltd., Warwickshire (GB)

(72) Inventors: David Smith, Salem, VA (US); Robert Gregory Wagoner, Salem, VA (US)

(73) Assignee: GE ENERGY POWER CONVERSION TECHNOLOGY LTD, Warwickshire (GB)

(*) Notice: Subject to any disclaimer, the term of this patent is extended or adjusted under 35 U.S.C. 154(b) by 0 days.

(21) Appl. No.: 14/677,995

(22) Filed: Apr. 3, 2015

(65) Prior Publication Data
US 2016/0291613 A1    Oct. 6, 2016

(51) Int. Cl.
*H01L 35/00* (2006.01)
*G05D 23/19* (2006.01)

(52) U.S. Cl.
CPC ................................ *G05D 23/1917* (2013.01)

(58) Field of Classification Search
CPC ....... H01L 2924/00; H01L 2924/01079; H01L 2924/0132; H05B 41/2806
See application file for complete search history.

(56) References Cited

U.S. PATENT DOCUMENTS

| | | | |
|---|---|---|---|
| 7,515,447 B2 | 4/2009 | Ronkainen et al. | |
| 7,598,685 B1* | 10/2009 | Shteynberg | H05B 33/0818 315/224 |
| 8,432,052 B2 | 4/2013 | Lu et al. | |
| 8,624,411 B2 | 1/2014 | Schmidt et al. | |
| 2006/0038627 A1* | 2/2006 | Ahmad | H03L 1/022 331/176 |
| 2011/0094724 A1* | 4/2011 | Huang | G05D 23/1909 165/201 |
| 2011/0309875 A1 | 12/2011 | Wei et al. | |
| 2012/0163055 A1* | 6/2012 | Qian | H02M 1/32 363/127 |
| 2013/0301326 A1 | 11/2013 | Zoels et al. | |
| 2013/0337756 A1* | 12/2013 | Wilson | H04B 5/0037 455/230 |

FOREIGN PATENT DOCUMENTS

| | | |
|---|---|---|
| CN | 202406038 | 8/2012 |
| EP | 0766308 | 4/1997 |
| WO | 2012142082 | 10/2012 |

* cited by examiner

*Primary Examiner* — Sibin Chen
(74) *Attorney, Agent, or Firm* — GE Global Patent Operation; Scott R. Stanley

(57) ABSTRACT

Provided is system including a temperature regulator including at least on regulation component in communication with a semiconductor within a converter, and a peak detector in communication with the semiconductor within the converter configured to identify a maximum temperature of each semiconductor. Also provided is a method for regulating temperature change of semiconductor components including measuring a semiconductor temperature, determining a reference temperature when the semiconductor is energized, summing the first semiconductor temperature and the reference temperature to generate a first temperature sum, comparing the first temperature sum to a coolant temperature to generate a first temperature difference. The method also circulates a fluid configured within the system such that the first temperature difference is adjusted.

7 Claims, 5 Drawing Sheets

LIFE OF A SEMICONDUCTOR BY REDUCING TEMPERATURE CHANGES THEREIN VIA SWITCHING FREQUENCY

FIELD OF INVENTION

The present invention relates generally to extending the useful life of a power semiconductor. More specifically, the present invention relates to extending the useful life of a semiconductor when operating as an electronic switch in renewable energy applications.

BACKGROUND OF THE INVENTION

Renewable energy, harvested from natural phenomena such as sunlight and wind, has replaced conventional fuels in areas of energy service and power generation. Electrical power devices, such as semiconductors, convert energy obtained from renewable energy sources, such as solar power and wind power, from dc or variable frequency ac to utility (grid) frequency. Conversion is generally achieved by switching a plurality of semiconductors on and off at high frequency to synthesize sine wave voltages via pulse width modulation (PWM) techniques.

Three-terminal semiconductors, such as insulated-gate bipolar transistor (IGBTs), metal-oxide-semiconductor field-effect transistors (MOSFETs), and thyristors are commonly used as switching devices in electrical applications. MOSFETs, used primarily in low voltage applications, may increase the current rating of a switch by placing several devices in parallel. Thyristors, used primarily in high voltage applications, require a finite time delay after the current in the thyristor has extinguished before the anode can again be positively biased and retain the thyristor in the off-state. IGBTs combine the performance in the on-state in high voltage devices with high impedance, thus making it a popular choice in power generation applications.

Transitioning each IGBT from the on-state to the off-state and vice versa results in heat production, as power is dissipated within each IGBT during switching events. The higher the current being switched on or off, the more losses, therefore the more heat. As current increases, the conduction losses within each IGBT also increase. Just as the power from renewable energy sources can often vary throughout a day, so can losses dissipated in the IGBTs. Therefore, the temperature of the IGBTs vary with changes in the output of the renewable energy sources. The thermal cycling, which may occur over minutes or hours, can result in mechanical stress and increased rates of IGBT failure over time due to material fatigue.

The life of an IGBT can be reduced due to thermal cycles. Thermal cycles, specifically in the baseplate and the bond wire of the switch, among others factors, results in device fatigue. Extreme changes between high and low temperatures decrease IGBT life more than small changes between high and low temperatures.

Prior attempts to increase fatigue tolerance within semiconductors are known in the art. For example, conventional approaches include variations of altering the surfaces of the semiconductor to prolong the life of the device. This approach, however, does not prevent cracks from expanding to critical sizes, for example, which can ultimately lead to fractures.

SUMMARY OF EMBODIMENTS OF THE INVENTION

Given the aforementioned problem, a need exists for systems and methods that prolong the life of a semiconductor by reducing temperature cycling due to variations in the renewable power generation. The systems and methods would prevent crack formations due to repetitive temperature cycles.

In the present technology, to keep IGBT heat losses from dropping in proportion to reductions in renewable power production, the converter may increase a PWM switching (chopping) frequency. The converter adjusts the PWM switching frequency inverse to the magnitude of the current. One in the art understands that an infinite variation in the PWM switching frequency is impractical. However, ranges of approximately two-to-one (2:1) to approximately ten-to-one (10:1) are feasible.

In one aspect, the present technology discloses a system for regulating temperature change of semiconductor components within a converter comprising (i) a temperature regulator comprising at least one regulation component in communication with at least one semiconductor within the converter, wherein the temperature regulator is in communication with at least one semiconductor within the converter and a power source, and (ii) a peak detector in communication with at least one semiconductor within the converter configured to identify a maximum temperature of each semiconductor.

The embodiments, for example, facilitate a reduction in temperature changes in the semiconductor. In some illustrious embodiments, a peak detector can be configured to more accurately identify temperature changes when the semiconductor conducts low current.

In other embodiments, a controller can be configured to alter the maximum temperature of the semiconductor, using a temperature regulator, to a temperature that increases useful life of the semiconductor.

In another aspect, the present technology discloses a method for determining temperature change of a semiconductor component within a converter comprising (i) measuring, by a temperature regulator, a first semiconductor temperature, at a junction located on the semiconductor component, (ii) calculating a reference temperature to determine a maximum temperature, when the semiconductor conducts high current, and a minimum temperature, when the semiconductor conducts low current, (iii) summing the first semiconductor temperature and the reference temperature to generate a first temperature sum, and (iv) comparing the first temperature sum to a coolant temperature to generate a first temperature difference.

In another aspect, the present technology discloses a method for modifying the temperature change of a semiconductor component within a converter comprising (i) measuring, by a temperature regulator, a first semiconductor temperature, at a junction located on the semiconductor component, (ii) calculating, a reference temperature, using a peak detector configured to determine a maximum temperature when the semiconductor conducts high current and a minimum temperature when the semiconductor conducts low current, (iii) summing, the first semiconductor temperature and the reference temperature, (iv) comparing, the first temperature sum to a coolant temperature to generate a first temperature difference, and (v) iterating, the first semiconductor temperature to generate a final semiconductor temperature, configured to adjust the first temperature difference according to power sent to the converter by a power source.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE PREFERRED EMBODIMENTS

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either, any, several, or all of the listed items.

The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
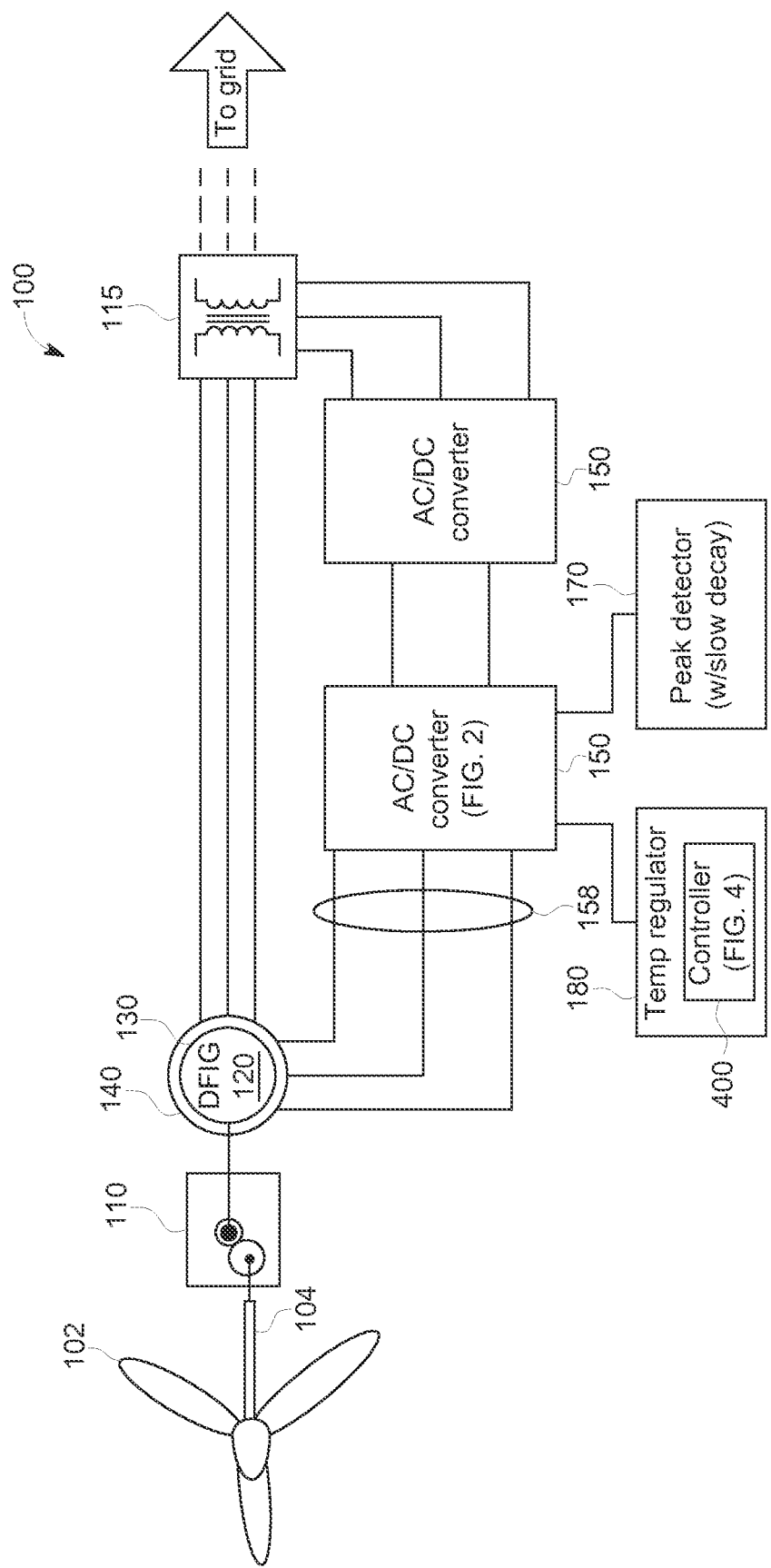
FIG. 1 is a block diagram illustrating an exemplary application for a variable frequency, in the form of a wind power converter system.

FIG. 1 depicts an exemplary application in the form of a wind power system 100, suitable for capturing power from wind using turbine blades 102. The system 100 may include a gearbox 110 connected to a turbine rotor 104 of the turbine blades 102. The gearbox 110 adapts the relatively low speed of the turbine rotor 104 with the relatively high speed of a generator 120.

The generator 120 (e.g., an induction generator or synchronous generator) converts the mechanical power into electrical power. For example, the generator 120 illustrated in FIG. 1 may be a doubly fed induction generator (DFIG), which includes a rotor winding 130 and a stator winding 140.

In the illustrated embodiment of FIG. 1, the stator winding 140 is connected to a transformer 115, which transfers electrical power through inductively coupled conductors to a suitable voltage level for an electrical grid. The rotor winding 130 may be connected to the grid by a converter and inverter module (e.g., a converter 150) which decouple mechanical and electrical frequencies (e.g., to enable variable-speed operation).

The converter and inverter module of the system 100 may include two three-phase converters 150. One converter 150 may be connected to the rotor winding 130 and the second converter 150 may be connected to the grid by the transformer 115. The ratio of the voltage produced by the stator winding 140 to the voltage produced by the rotor winding 130 known as the S-R ratio, can be used to determine qualitative factors about the converters 150, such as, but not limited to, temperature within the converter.

Figure 2:
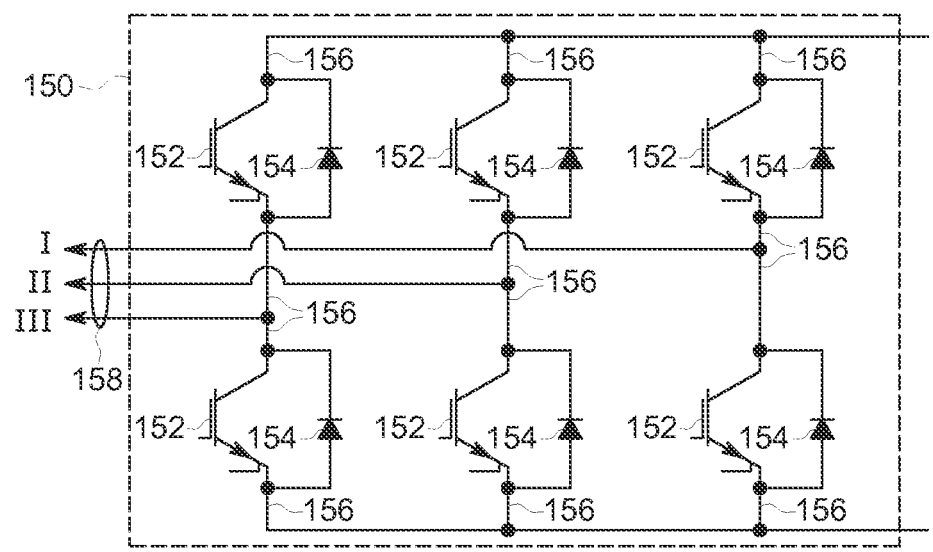
FIG. 2 is a schematic diagram illustrating an inverter in the exemplary application of FIG. 1.

FIG. 2 is an example configuration of the converter 150 including one or more semiconductors. The converter 150 may include a plurality of IGBTs 152 and power diodes 154, each diode 154 being antiparallel to a respective IGBT 152. Each IGBT 152 and diode 154 are joined to positive or negative DC lines and output lines I, II, or III with bond wires 156. As seen in the example topology of FIG. 2, the output lines I, II, and III may output three-phase voltages $v_I$, $v_{II}$, and $v_{III}$. Changes to the output current of the IGBTs 152, used to produce a three-phase output current waveform at the output 158, can result in power losses, resulting in a higher junction temperature at the IGBTs 152. Such junction temperatures may result in mechanical strain and/or deformation of the bond wires 156, shortening the lifespan of the converters 150.

Cumulative damage (C), due to extreme high or low temperatures, determines semiconductor failure based on the number of thermal cycles and can be defined by the relationship $$C = \frac{n_1}{N_1} + \frac{n_2}{N_2} + \ldots + \frac{n_i}{N_i},$$

where $n_i$ is the number of cycles at the $i^{th}$ stress level and $N_i$ is the number of cycles to failure at the $i^{th}$ stress level.

Figure 3:
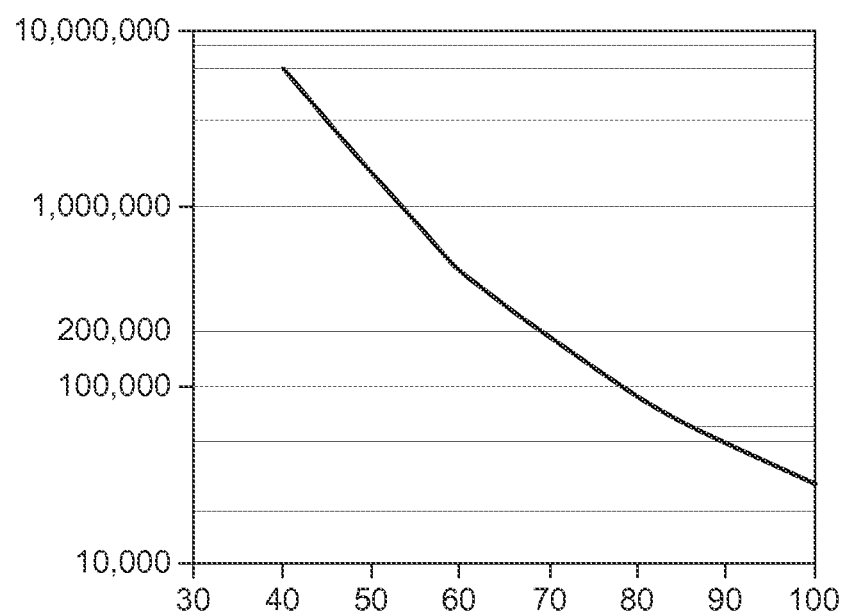
FIG. 3 is a graph representing a mean time to failure of a semiconductor device of FIG. 2 operating at different temperatures.

FIG. 3 is a graph illustrating a semiconductor lifetime curve where change in temperature of the semiconductor device from ON to OFF is shown along the x-axis. The number of cycles until failure is shown along the y-axis.

As seen in FIG. 3, reduction in a temperature change ($\Delta T$) by approximately 10° C. improves the semiconductor life by a factor of two. For example, changing the $\Delta T$ from 80° C. to 70° C. improves the life from under 100,000 cycles to nearly 200,000 cycles. Similarly, reducing the $\Delta T$ from 70° C. to 60° C. improves the life from about 200,000 cycles to more than 400,000 cycles.

Referring back to FIG. 1, to assist in the regulation of $\Delta T$ within the converters 150, the system 100 can include additional components, such as a peak detector 170 and a temperature regulator 180, to control one or more operations of the converters 150.

The peak detector 170 can be implemented as a series connection of a diode and a capacitor (not shown) outputting a direct current (DC) voltage equal to the peak value of an applied alternating current (AC) signal. An AC voltage source applied to the peak detector 170 charges the capacitor to the peak of the input. The diode conducts positive "half cycles," charging the capacitor to the waveform peak. When the input waveform falls below the DC "peak" stored on the capacitor, the diode is reverse biased, blocking current flow from capacitor back to the source. Thus, the capacitor retains the peak value even as the waveform drops to zero.

The peak detector 170 can perform automatic measurements on multiple channels approximately simultaneously. The resultant measurements can be used to show data (e.g., plot in graphical form) or transfer the data to another program for alternate use (e.g., transferred to another program). The peak detector 170 can also detect positive peaks (e.g., maximum wavelength heights) or negative peaks (e.g., minimum wave height). The peak detector 170 is described in further detail below, in association with FIG. 5.

The temperature regulator 180 attenuates temperature variations within the converter(s) 150. Increasing the PWM switching frequency keeps the IGBTs 152 from cooling down too much when the power source diminishes.

In some embodiments, when the speed of the turbine rotor 104 exceeds a normal operating range, additional regulation components, such as fans, heaters, and pumps (not shown), in conjunction with the temperature regulator 180, allow temperature of a coolant to rise. When the power source disappears, as the coolant temperature rises, the PWM switching frequency can be reduced and an IGBT bridge within the converter 150 can be turned off.

In this situation, heaters can be used to increase the temperature of the coolant. Alternately, pump speed can be adjusted and/or operation of an anti-condensation system can be used to increase the temperature of the coolant.

In some embodiments, the temperature regulator 180 and/or the other regulation components (e.g., cooling fans and/or heaters), can be operated via one or more controllers, such as a controller 400 described in association with FIG. 4 below.

The controller 400 can include a processor to monitor the PWM switching frequency by the converter 150 on the grid side. The controller 400 also includes a memory 410. The memory 410 is configurable for storing several categories of software, firmware, and data including, applications 420, a database 430, an operating system (OS) 440, and I/O device drivers 450.

As will be appreciated by those skilled in the art, the OS 440 can be any operating system for use with a data processing system. The I/O device drivers 450 can include various routines accessed through the OS 440 by the applications 420 to communicate with devices, and certain memory components.

The applications 420 can be stored in the memory 410 and/or in a firmware (not shown) as executable instructions and can be executed by a processor 460.

The applications 420 include various programs, such as an iterative temperature sequence 502 that, when executed by the processor 460, process data received into the temperature regulator 180.

The applications 420 may be applied to data stored in the database 430, such as the specified parameters, along with data, e.g., received via the I/O data ports 470. The database 430 represents the static and dynamic data used by the applications 420, the OS 440, the I/O device drivers 450 and other software programs that may reside in the memory 410.

While the memory 410 is illustrated as residing proximate the processor 460, it should be understood that at least a portion of the memory 410 can be a remotely accessed storage system, for example, a server on a communication network. The communications network can include a local area network (LAN), a metropolitan area network (MAN), or a wide area network (WAN), for example.

Figure 4:
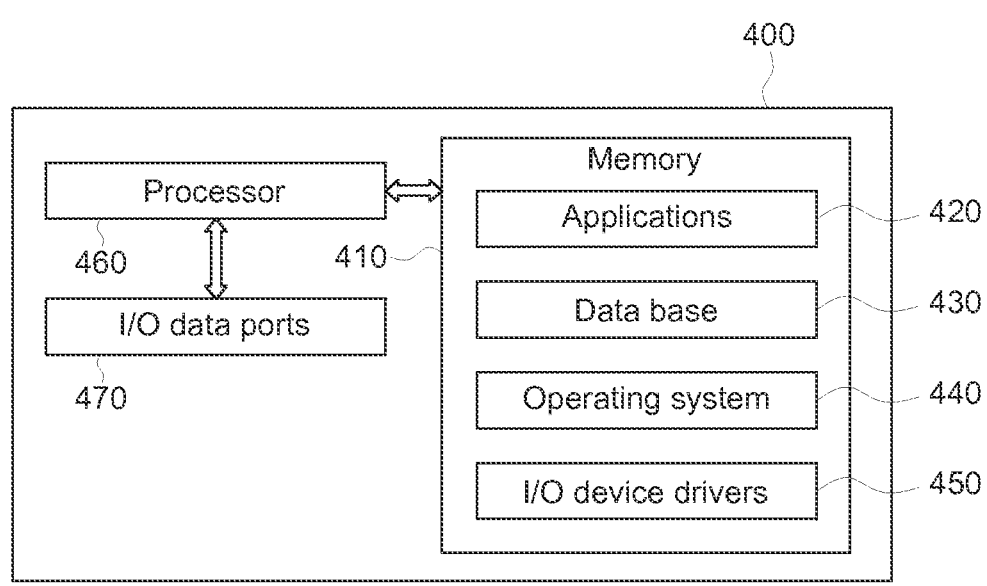
FIG. 4 is a block diagram of a controller of the data integration systems for FIG. 1.

It should be understood that FIG. 4 and the description above are intended to provide a brief, general description of a suitable environment in which the various aspects of some embodiments of the present disclosure can be implemented. While the description refers to computer-readable instructions, embodiments of the present disclosure can also be implemented in combination with other program modules and/or as a combination of hardware and software in addition to, or instead of, computer readable instructions.

Figure 5:
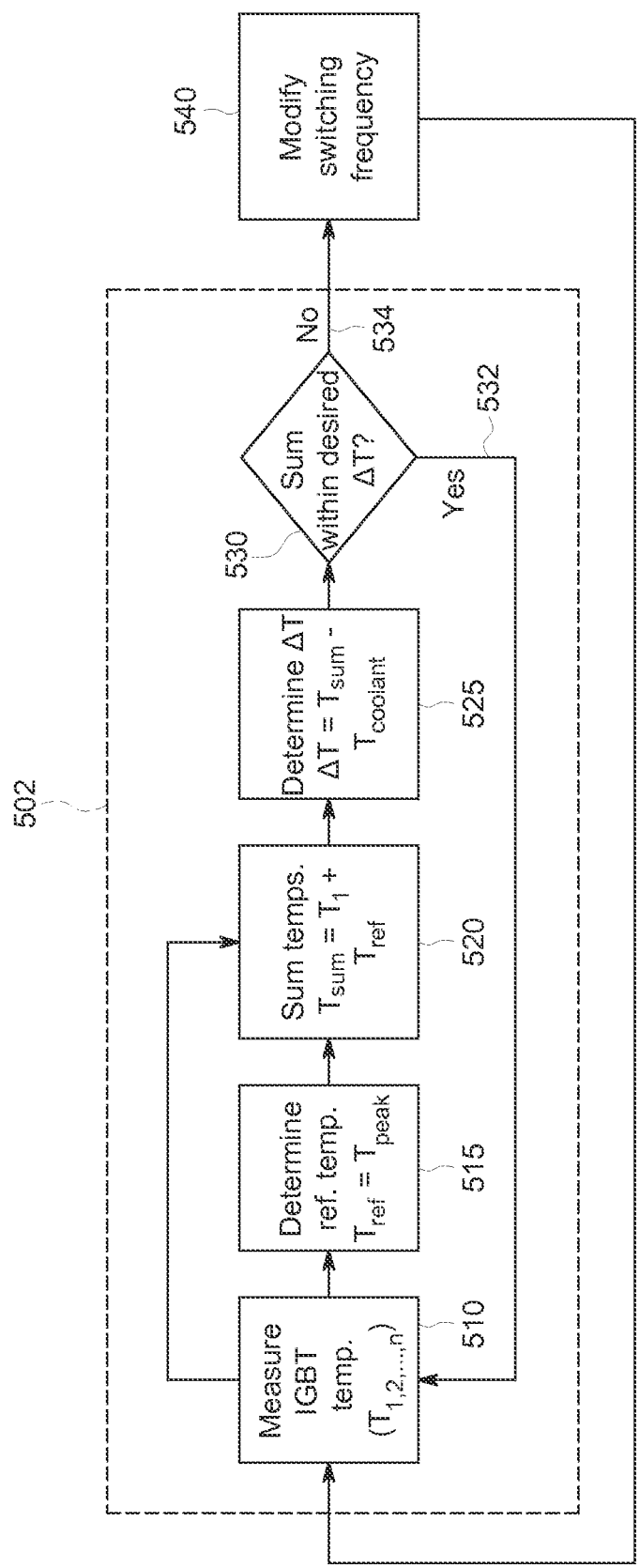
FIG. 5 is a flow chart illustrating methods associated with the controller of FIG. 4.

FIG. 5 is a flow chart illustrating an exemplarily application executed by the controller 400. The application can be configured to execute an iterative temperature sequence 502, to whether the temperature of the IGBT 152 (seen in FIG. 2) is within a predetermined temperature range. If the IGBT 152 is within the predetermined temperature range, the iterative temperature sequence 502 repeats. However, if the IGBT 152 is not within the predetermined temperature range, the PWM switching frequency of the converter(s) 150 are modified.

It should be understood that although the application is discussed in terms of PWM switching frequency. However, it is contemplated that the application may be executed using another type of switching frequency (e.g. a switching frequency that produces a smooth resultant waveform as perceived by the load).

It should also be understood that the steps of the application are not necessarily presented in any particular order and that performance of some or all the steps in an alternative order, is possible and is contemplated.

The software may be engaged through the controller 400 communicating an "engage response mode" instruction message through an interface, which sends the initial request to measure a starting temperature of the IGBT 152 within the converter 150, as depicted in the iterative temperature sequence 502.

The sequence 502 begins when the controller 400 measures a starting temperature, $T_1$, of one or more IGBTs 152 within the converter at step 510. The starting temperature of the IGBT can be measured through any known measuring device such as, but not limited to, thermometers and gauges.

The sequence 502 continues with the controller 400 determining a reference temperature, $T_{ref}$, a desired value for the IGBT temperature, at step 515.

In one embodiment, $T_{ref}$ can be measured using the peak detector 170. The peak detector 170 can be configured to determine a maximum temperature when the IGBT 152 conducts high current and a minimum temperature when the IGBT 152 conducts low current. The peak detector 170 may include a capacitor discharge rate that is gradual, also known as a slow-decay. Additionally, long periods of operation of the converter(s) 150 at a light load may also cause the slow-decay. The discharge rate includes a discharge time sufficient to reach a desired temperature. Since heating of the IGBT 152 is a byproduct of the converter load, $T_{ref}$ can be a maximum or minimum (peak) temperature point resulting from operation of the converter(s) 150.

The iterative temperature sequence 502 sums the starting temperature $T_1$ from step 510 with $T_{ref}$ determined at step 515, to generate a summed temperature, $T_{sum}$, at step 520. For example, during the initial temperature sequence, the summed temperature can be expressed as $$T_{sum} = T_1 + T_{ref}$$

where $T_1$ is the starting temperature. In subsequent sequence iterations, the summed temperature can be expressed as $$T_{sum} = T_{2,\ldots,n} + T_{ref}$$

where $T_2$ is a first adjusted temperature of the IGBT 152 within the iteration sequence 502 and $T_n$ is the temperature associated with an "$n^{th}$" iteration of the PWM switching frequency.

The temperature difference ($\Delta T$), between $T_{sum}$ and the temperature of the coolant ($T_{coolant}$), is calculated at step 525. Also determined within the iterative temperature sequence 502 is whether $\Delta T$ is within a predetermined range, at step 530. The predetermined range is such that the life of the IGBT 152 will reduce failure due to temperature related failures as described above. For example, $\Delta T$ may be a value of 10° C.

Where $\Delta T$ is within the predetermined range (e.g., path 532), the controller 400 can return to step 510 were the temperature of the IGBT 152 is measured. Where $\Delta T$ is not within the predetermined range (e.g., path 534), the controller 400 can modify the PWM switching frequency of the IGBTs 152 within the converter 150 at step 540.

The PWM switching frequency can be modified within the system 100 until a shut off event occurs. A shut off event may be any event that is predetermined to stop the PWM switching frequency of IGBTs 152. For example, a predetermined passage of time. When a shut off event has occurred, the controller 400 will measure the effect of modifying the PWM switching frequency on the temperature of the IGBT 152. Specifically, measuring an adjusted temperature, $T_2$ at step 510.

The controller 400 can modify the PWM switching frequency and the iteration sequence until the $\Delta T$ is within the predetermined range. For example, controller 400 can include up to "n" iterations.

Figure 6:
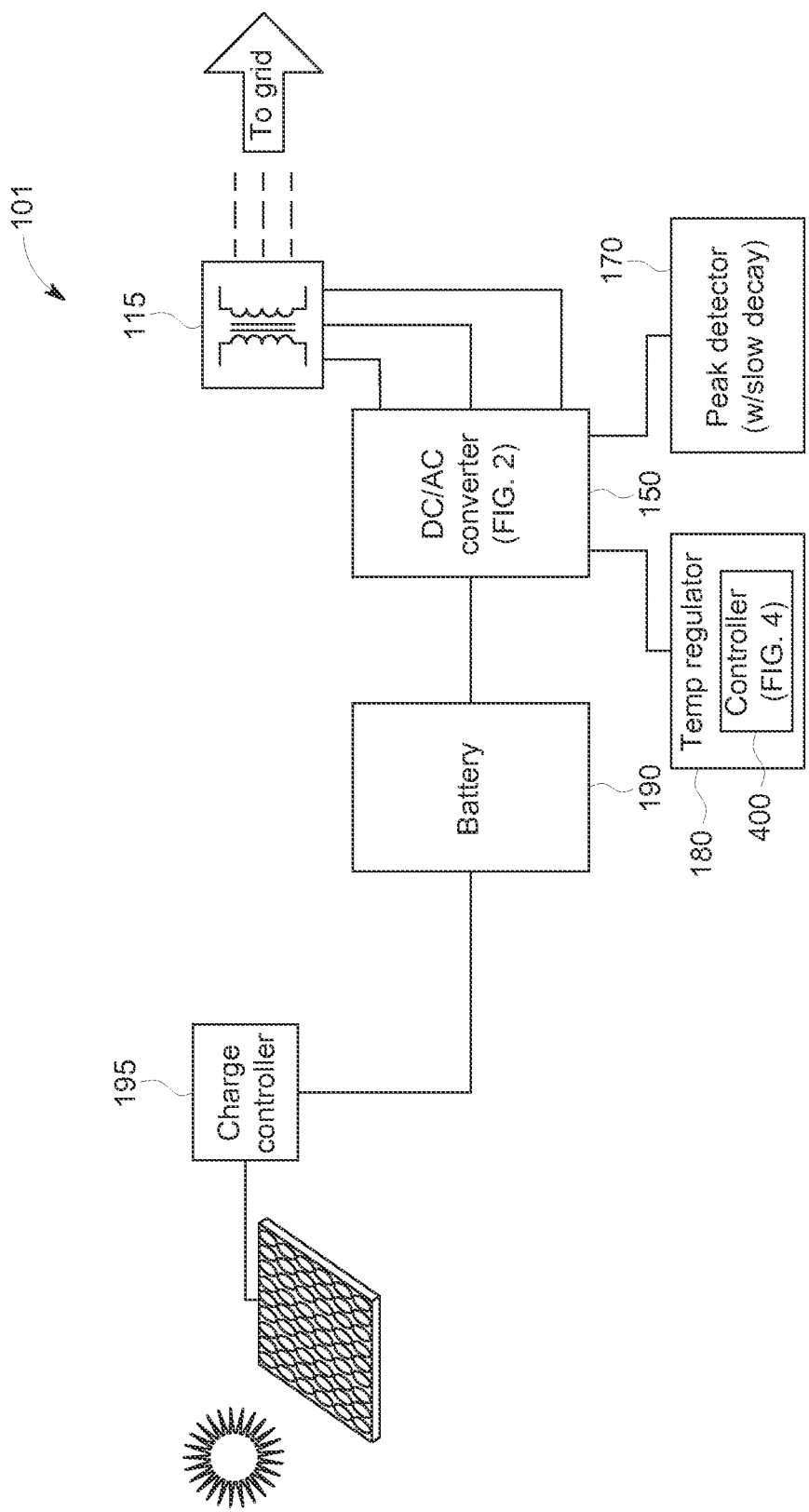
FIG. 6 is a block diagram illustrating an exemplary application for a variable frequency, in the form of a solar power converter system.

Alternate forms of renewable energy, such as a solar power system 101, depicted in FIG. 6 could utilize several embodiments of the disclosed invention. In these embodiments, solar energy is converted into electrical energy through the use of a battery 190 in connection with the converter 150.

The system 101 can additionally contain a charge controller 195 to regulate the rate at which current is added to or drawn from the battery 190. AC and/or DC isolation devices (not shown). Isolation devices allow disconnection of the solar power source (e.g., solar panel) in events such as electrical fault or device maintenance servicing.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What we claim is:

1. A system for regulating temperature change of semiconductor components within a converter, comprising:
   a temperature regulator including at least one regulation component in communication with (i) at least one semiconductor within the converter and (ii) a power source, the temperature regulator including a controller configured to minimize thermal cycling in the at least one semiconductor, using a PWM switching frequency;
   a peak detector in communication with the at least one semiconductor and configured to identify a maximum temperature of the semiconductor when the semiconductor conducts high current, and to identify a minimum temperature of the semiconductor when the semiconductor conducts low current;
   the peak detector being further configured to identify a change in temperature of the semiconductor including: calculate a reference temperature to determine a maximum temperature of the semiconductor when the semiconductor conducts high current and a minimum temperature of the semiconductor when the semiconductor conducts low current, sum a first semiconductor temperature and the reference temperature to generate a first temperature sum; and compare the first temperature sum to a coolant temperature to generate a first temperature difference.

2. The system of claim 1 wherein the at least one regulation component is configured to regulate the maximums temperature of at least one semiconductor.

3. The system of claim 1 wherein the peak detector includes a discharge time sufficient to reach a desired temperature of the semiconductor.

4. The system of claim 1 wherein a controller is configured to alter the maximum temperature of the at least one semiconductor, using a temperature regulator, to a temperature that increases useful life of the semiconductor.

5. The system of claim 1 wherein a controller calculates a modifier to the PWM switching frequency of the converter.

6. The system of claim 5 wherein the modifier facilitates switching of the power source to the converter.

7. The system of claim 1 wherein the peak detector is further configured to identify a final semiconductor temperature by iterating the first semiconductor temperature.

* * * * *